United States Patent
Cumin et al.

(10) Patent No.: US 10,173,175 B2
(45) Date of Patent: *Jan. 8, 2019

(54) INTEGRATED GAS SPARGER FOR AN IMMERSED MEMBRANE

(71) Applicant: BL TECHNOLOGIES, INC., Minnetonka, MN (US)

(72) Inventors: Jeffrey Ronald Cumin, Hamilton (CA); Reid Allyn Bayly, East York (CA); Yongseck Hong, Burlington (CA)

(73) Assignee: BL TECHNOLOGIES, INC., Minnetonka, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/156,532

(22) Filed: May 17, 2016

(65) Prior Publication Data

US 2016/0256831 A1 Sep. 8, 2016

Related U.S. Application Data

(63) Continuation of application No. 12/905,701, filed on Oct. 15, 2010, now Pat. No. 9,364,805.

(51) Int. Cl.

| *B01D 63/02* | (2006.01) |
|---|---|
| *B01D 63/04* | (2006.01) |
| *B01D 65/08* | (2006.01) |
| *B01D 61/18* | (2006.01) |
| *B01F 13/02* | (2006.01) |

(Continued)

(52) U.S. Cl.
CPC ............ *B01D 65/08* (2013.01); *B01D 61/18* (2013.01); *B01D 63/043* (2013.01); *B01F 3/04241* (2013.01); *B01F 13/0255* (2013.01); *B01D 65/02* (2013.01); *B01D 2313/21* (2013.01);

(Continued)

(58) Field of Classification Search
CPC .... B01D 65/02; B01D 65/08; B01D 2321/18; B01D 2321/185; B01D 2321/40; B01D 63/02; B01D 63/04; B01D 63/043; B01D 2313/26; B01D 2313/21

See application file for complete search history.

(56) References Cited

U.S. PATENT DOCUMENTS

| 1,574,783 A | 3/1926 | Beth |
| 3,068,655 A | 12/1962 | Murray et al. |

(Continued)

FOREIGN PATENT DOCUMENTS

| CN | 1931419 A | 3/2007 |
| CN | 101448562 A | 6/2009 |

(Continued)

OTHER PUBLICATIONS

Unofficial English Translation of Japanese Office Action issued in connection with Related JP Application No. 2015217626 dated Dec. 20, 2016.

(Continued)

*Primary Examiner* — Katherine Zalasky

(57) ABSTRACT

A gas sparger produces an intermittent flow of bubbles even if provided with a continuous gas flow. The sparger has a housing to collect a pocket of gas and a conduit to release some of the gas from the pocket when the pocket reaches a sufficient size. The housing is integrated with the potting head of a module. The conduit passes through the potting head.

8 Claims, 2 Drawing Sheets

(51) Int. Cl.
*B01F 3/04* (2006.01)
*B01D 65/02* (2006.01)

(52) U.S. Cl.
CPC .... *B01D 2313/26* (2013.01); *B01D 2321/185* (2013.01)

(56) References Cited

U.S. PATENT DOCUMENTS

| | | |
|---|---|---|
| 3,246,761 A | 4/1966 | Bryan et al. |
| 3,592,450 A | 7/1971 | Rippon |
| 3,628,775 A | 12/1971 | Mcconnell et al. |
| 3,847,508 A | 11/1974 | Mowen |
| 3,898,018 A | 8/1975 | Weis |
| 4,169,873 A | 10/1979 | Lipert |
| 4,187,263 A | 2/1980 | Lipert |
| 4,356,131 A | 10/1982 | Lipert |
| 4,439,316 A | 3/1984 | Kozima et al. |
| 4,478,211 A | 10/1984 | Haines et al. |
| 4,569,804 A | 2/1986 | Murphy |
| 4,676,225 A | 6/1987 | Bartera |
| 4,752,421 A | 6/1988 | Makino |
| 4,789,503 A | 12/1988 | Murphy |
| 4,828,696 A | 5/1989 | Makino et al. |
| 4,906,363 A | 3/1990 | Makino et al. |
| 4,911,838 A | 3/1990 | Tanaka |
| 4,923,614 A | 5/1990 | Engelbart |
| 5,169,781 A | 12/1992 | Nojima et al. |
| 5,605,653 A | 2/1997 | Devos |
| 5,618,431 A | 4/1997 | Kondo et al. |
| 5,620,891 A | 4/1997 | Drummond et al. |
| 5,639,373 A | 6/1997 | Mahendran et al. |
| 5,783,083 A | 7/1998 | Henshaw et al. |
| 5,805,653 A | 9/1998 | Hettiarachchi et al. |
| 6,162,020 A | 12/2000 | Kondo |
| 6,245,239 B1 | 6/2001 | Cote et al. |
| 6,899,812 B2 | 5/2005 | Cote et al. |
| 7,017,557 B2 | 3/2006 | Rumpf |
| 7,022,231 B2 | 4/2006 | Mahendran et al. |
| 7,294,255 B2 | 11/2007 | Kondo |
| 7,867,395 B2 | 1/2011 | Ekholm et al. |
| 7,879,229 B2 | 2/2011 | Phagoo et al. |
| 9,358,505 B2 * | 6/2016 | Cumin ................ B01D 61/08 |
| 9,364,805 B2 * | 6/2016 | Cumin ................ B01D 61/18 |
| 9,433,903 B2 * | 9/2016 | Cumin ................ B01D 61/08 |
| 2003/0178369 A1 | 9/2003 | Eguchi et al. |
| 2005/0006308 A1 | 1/2005 | Cote et al. |
| 2006/0201876 A1 | 9/2006 | Jordan et al. |
| 2007/0039888 A1 | 2/2007 | Ginzburg et al. |
| 2007/0166171 A1 | 7/2007 | Kondo |
| 2009/0194477 A1 | 8/2009 | Hashimoto |
| 2009/0215142 A1 | 8/2009 | Tsai et al. |
| 2009/0236280 A1 | 9/2009 | Morita et al. |
| 2009/0255872 A1 | 10/2009 | Busnot et al. |
| 2010/0300968 A1 | 12/2010 | Liu et al. |
| 2011/0100907 A1 | 5/2011 | Zha et al. |

FOREIGN PATENT DOCUMENTS

| | | |
|---|---|---|
| EP | 0937494 A2 | 8/1999 |
| EP | 1119522 B1 | 4/2004 |
| EP | 1652572 A1 | 5/2006 |
| EP | 1897857 A1 | 3/2008 |
| GB | 996195 A | 6/1965 |
| JP | 5643438 Y2 | 10/1981 |
| JP | S5643438 Y2 | 10/1981 |
| JP | S62262185 A | 11/1987 |
| JP | S62268838 A | 11/1987 |
| JP | 638472 Y2 | 3/1988 |
| JP | H01104396 A | 4/1989 |
| JP | H01111494 A | 4/1989 |
| JP | H04265128 A | 9/1992 |
| JP | H07185270 A | 7/1995 |
| JP | H07185271 A | 7/1995 |
| JP | H0810589 A | 1/1996 |
| JP | H08141566 A | 6/1996 |
| JP | 08257372 A | 10/1996 |
| JP | H08312161 A | 11/1996 |
| JP | H0938470 A | 2/1997 |
| JP | H09220569 A | 8/1997 |
| JP | 2003340250 A | 12/2003 |
| JP | 2004322100 A | 11/2004 |
| JP | 2006081979 A | 3/2006 |
| KR | 20010112874 A | 12/2001 |
| WO | 9706880 A2 | 2/1997 |
| WO | 9828066 A1 | 7/1998 |
| WO | 0021890 A1 | 4/2000 |
| WO | 2004050221 A1 | 6/2004 |
| WO | 2004056458 A2 | 7/2004 |
| WO | 2005105275 A1 | 11/2005 |
| WO | 2006029465 A1 | 3/2006 |
| WO | 2006066319 A1 | 6/2006 |
| WO | 2008001730 A1 | 1/2008 |
| WO | 2008144826 A1 | 12/2008 |
| WO | 2008153818 A1 | 12/2008 |
| WO | 2011028341 A1 | 3/2011 |

OTHER PUBLICATIONS

Aintetsuku, English Abstract of JP 08312161 published Nov. 26, 1996.
Asahi Kasei Chemicals, English Abstract of JP2006081979 published Mar. 30, 2006.
Australian Patent Application No. 2011313970, Notice of Acceptance dated Jun. 23, 2016.
China Petrochemical Corp., English Abstract of CN1931419 published Mar. 21, 2007.
Chinese Patent Application No. 201180049733.9, Office Action dated May 26, 2014—Unofficial English Translation Available.
Cumin et al., U.S. Appl. No. 12/905,701, filed Oct. 15, 2010.
Hitachi Ltd., English Abstract of JP09-038470 published Feb. 10, 1997.
Infilco Degremont, "Cannon Mixer," obtained before Sep. 3, 2009.
Infilco Degremont, Infilco Cannon Mixer—Enhanced Sludge Mixing Technology, [online], [retrieved on Oct. 1, 2012]. Retrieved from Internet.
International Patent Application No. PCT/US2010/043926, International Preliminary Report on Patentability dated Mar. 6, 2012.
International Patent Application No. PCT/US2010/043926, International Search Report and Written Opinion dated Oct. 21, 2010.
International Patent Application No. PCT/US2011/054530, International Search Report and Written Opinion dated Apr. 27, 2012.
Kubota Copr, English Abstract of JP08141566 published Jun. 4, 1996.
Kubota Copr, English Abstract of JP09220569 published Aug. 26, 1997.
Kurita Water Ind Ltd, English Abstract of JP07185270 published Jul. 25, 1995.
Kurita Water Ind Ltd, English Abstract of JP07185271 published Jul. 25, 1995.
Kurita Water Ind Ltd, English Abstract of JP2004322100 published Nov. 18, 2004.
Mini-Ject Above-Grade Ejector Lift Station, [online], printed Jan. 28, 2009. Retrieved from the Internet.
Shinko Pfaudler Co Ltd, English Abstract of JP 01104396 published Apr. 21, 1989.
Shinko Pfaudler Co Ltd, English Abstract of JP01111494 published Apr. 28, 1989.
U.S. Appl. No. 12/905,701, Final Office Action dated Oct. 25, 2012.
U.S. Appl. No. 12/905,701, Non Final Rejection dated Jul. 8, 2014.
U.S. Appl. No. 12/905,701, Non-Final Office Action dated Jan. 23, 2015.
U.S. Appl. No. 12/905,701, Non-Final Office Action dated May 8, 2012.
U.S. Appl. No. 12/905,701, Notice of Allowance dated Feb. 16, 2016.
U.S. Appl. No. 12/905,701, Notice of Allowance dated Jul. 31, 2015.

(56) References Cited

OTHER PUBLICATIONS

U.S. Appl. No. 13/394,104, Non-Final Office Action dated Dec. 3, 2015.
U.S. Appl. No. 15/156,957, Non-Final Office Action dated Jul. 3, 2018.
Korean Patent Application No. 10-2017-7009907, Office Action dated Nov. 21, 2017—English Translation Available.
U.S. Appl. No. 15/156,957, Restriction Requirement dated Jan. 29, 2018.
Canadian Patent Application No. 2,773,180, Office Action dated Sep. 26, 2017.
Korean Patent Appln. No. 10-2017-7011198, Office Action dated Jan. 29, 2018.
Korean Patent Application No. 10-2018-7020343, Office Action dated Aug. 31, 2018—English Translation Available.

* cited by examiner

INTEGRATED GAS SPARGER FOR AN IMMERSED MEMBRANE

RELATED APPLICATIONS

This application is a continuation of U.S. application Ser. No. 12/905,701 filed Oct. 15, 2010, which is incorporated herein by reference.

FIELD

This specification relates to a gas sparger and to gas scouring to inhibit fouling of a filtering membrane.

BACKGROUND

The following background discussion is not an admission that anything discussed below is citable as prior art or common general knowledge.

International PCT publication WO/2000/021890 describes an aeration system for a submerged membrane module that has a set of aerators connected to an air blower, valves and a controller adapted to alternately provide a higher rate of air flow and a lower rate of air flow in repeated cycles to individual aerators. In an embodiment, the air blower, valves and controller, simultaneously provide alternating air flows to two or more sets of aerators such that while the total system air flow is constant, allowing the blower to be operated at a constant speed, each aerator receives a flow of air that varies over time. In some embodiments, the flow of air to an aerator occurs in repeated cycles of short duration. Transient flow conditions result in the tank water which helps avoid dead spaces and assists in agitating the membranes. WO/2000/021890 is incorporated herein in its entirety by this reference to it.

INTRODUCTION

The following discussion is intended to introduce the reader to the more detailed discussion to follow, and not to limit or define any claim.

The air cycling process described in WO/2000/021890 has proven to be very effective at reducing the amount of air or other gas, and therefore energy, required to operate an immersed membrane system. It was noted in WO/2000/021890 that rapid valve movements result in very large bubbles being created for a brief period of time, and that these very large bubbles might help inhibit membrane fouling. However, it was also noted in WO/2000/021890 that creating these large bubbles required producing undesirable pressure spikes in the aeration system.

A burst of large bubbles can be used to break up a fouling film, gel or cake formed on a membrane, or accumulated around the membrane. Once the fouling structure is ruptured, less intense aeration at the end of a burst, or provided by other aerators between bursts, can continue to remove the foulants. The instantaneous gas flow rate during a burst may be 1.25 to 10 times that of conventional gas sparging. The duration of the burst of gas may be between 1 and 10 seconds. The frequency of the bursts may be from once every 2 seconds to once every 24 hours. Bursts may be created by temporarily increasing the gas pressure or flow of an existing aeration system, by a secondary gas sparging system or, as will be described below, by accumulating gas in a device configured to periodically release the accumulated gas.

A gas sparger, alternately called an aerator, will be described below that produces an intermittent flow of bubbles even when provided with a continuous gas flow. The flow of bubbles can be in the form of short bursts of very large bubbles. One or more gas spargers may be integrated or combined with a membrane module. Bubbles can be released in bursts within or at the sides, or both, of a bundle of hollow fiber membranes.

A potting head, or a permeate collector or gas conduit below a potting head, provides the top of a housing to collect a pocket of gas. A conduit passing through the potting head releases at least some of the gas from the pocket when the pocket reaches a sufficient size. Optionally, a cover or diffuser above the potting head and over an outlet from the conduit may direct the released gas or break up the released gas into smaller (though still large) bubbles or both. Even if fed with a continuous supply of gas, the sparger produces discrete periods of bubble flow, typically in the form of short bursts of large bubbles.

DETAILED DESCRIPTION

Figure 1:
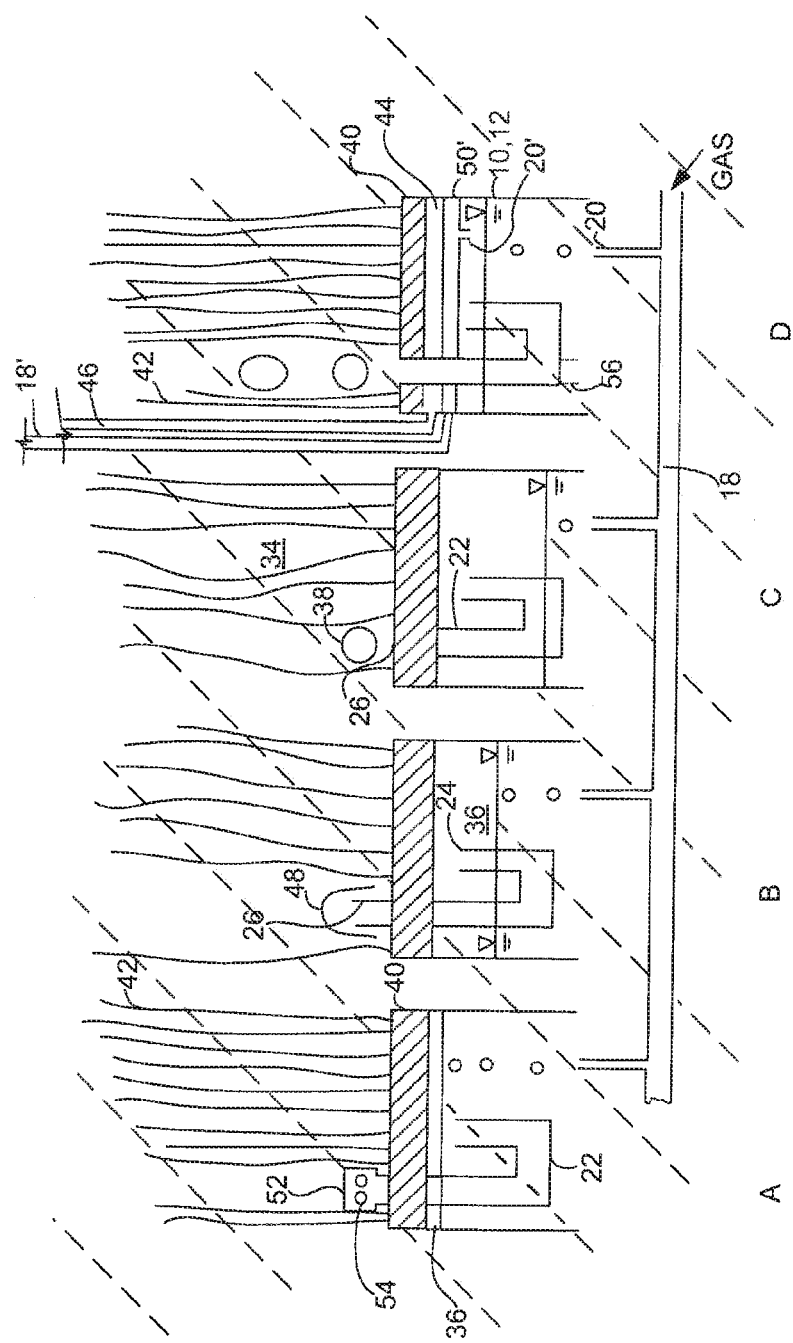
FIG. 1 shows a schematic side view of four spargers immersed in a liquid at various stages in an aeration process.

FIG. 1 shows four spargers 10 integrated with the potting heads 40 of four membrane modules A, B, C and D. A potting head 40 may alternately be called a header. Each potting head 40 is typically a block of a potting material such as a hardened resin. The ends of a plurality of hollow fiber membranes 42 are potted into the potting head. In the case of modules A, B and C, the ends of the membranes 42 are plugged in the potting head 40. A second potting head (not shown) is provided at the other ends of the membranes 42 to withdraw permeate from the lumens of the membranes 42, for example by way of a suction applied to a permeate cavity in communication with the lumens of the membranes 42. In module D, the ends of the membranes 42 are open to a permeate cavity 44 which is in turn connected to a permeate withdrawal pipe 46. The upper ends of the membranes 42 in module D may be individually plugged and loose (not held in a potting head), plugged collectively into one or more upper potting heads, or potted in a second permeating potting head. The bottom of the potting head 40, or a mold for the potting head 40, or the bottom of the permeate cavity 44, or the bottom of a gas distribution conduit (not shown) below the permeate cavity 44, defines the top of a housing 12 below the potting head 40. The housing 12 also has walls extending below the potting head 40 to define an open bottomed plenum below the potting head 40.

A sparger 10 receives a flow of a gas, typically air, from a gas distribution pipe 18. The gas is discharged below or directly into the sparger 10 through one or more gas outlets 20 in communication with the distribution pipe 18. The distribution pipe 18 may be located near the bottom of sparger 10 as shown or at other elevations. For example, an alternative distribution pipe 18' may be connected to a gas conduit 50 formed by placing a horizontal wall below and parallel to the bottom of the potting head 40 or the bottom of the permeate cavity 44 as shown for module D. In the case of module D, the gas conduit 50 and permeate cavity 44 may each be connected to one or more adjacent modules such that the gas pipe 18 and permeate pipe 46 serve multiple modules without being directly connected to all of them. The gas distribution pipe 18 may also be located above the module, with a gas line dropping down to the sparger 10.

A sparger 10 has a discharge conduit 22 passing through the potting head 40. The discharge conduit has a first outlet 24 in communication with an area inside and near the top of the housing 12, and a second outlet 26 open to the outside of the housing 12 above the potting head 40. At least a portion of the conduit 22 extends downwards between the first opening 24 and the second opening 26. Another portion of conduit 22 extends upwards again before reaching the second opening 26. Gas leaving the housing 12 through the conduit 22 must pass through a low point in the conduit 22 between the first opening 24 and the second opening 26, as in the generally J or U shaped conduits 22 shown. Second opening 26 may have an area of 1 to 10 square cm or 3 to 6 square cm. The cross-sectional area of a pocket of gas in communication with a conduit 22 is preferably larger than the area of the second opening 26 by a factor of 10 or more, for example by a factor in the range of 20 to 35. If the cross-sectional area of a pocket of gas is small relative to the area of the second opening 26, then the low point of the conduit 22 and the walls of the housing 12 may be made lower to increase the volume of air in a pocket of gas in communication with the conduit 22.

A cap 48 or diffuser 52 may optionally be provided over the potting head 40 in communication with the second opening 26. The diffuser 52 may be, for example, a chamber with a plurality of holes 54 to cause a flow of air from the conduit 22 to break up into smaller bubbles. The cap 48 directs the flow of gas from the conduit downwards to the upper face of the potting head 40 or across the potting head 44 and may also cause gas flowing from the conduit 22 to break up into smaller bubbles. A solid cap 48 extending below the second opening 26 as shown may tend to trap a pocket of gas below the cap 48, which may interfere with the re-flooding of the conduit 22. If this occurs, holes may be provided in the cap 48 above the second opening, the lower edge of the cap 48 may be scalloped to provide horizontal openings near or above the height of the second opening 26, or the second opening may be lowered relative to the bottom of the cap 48, or the cap 48 may be raised relative to the second opening 26.

The operation of a sparger 10 immersed in a liquid 34 is illustrated schematically in FIG. 1 in that parts A, B, C and D each show a sparger 10 at four different points in a sequence that occurs in a single sparger 10 as a gas is fed into it. The sequence progresses from the conditions shown for A to B to C to D and then returns to condition A, and repeats for as long as a supply of a gas is provided to a sparger 10. In Part A of FIG. 5, a conduit 22 is flooded with liquid 34, although a pocket of gas 36 may be trapped in the housing 12. In Part B, the pocket of gas 36 grows in size as gas from distribution pipe 18 is collected in housing 12 and displaces liquid 34. Liquid 34 leaves the housing 12 through an opening to the bottom of the housing 12 and through conduit 22. In Part C, after the expanding pocket of gas 36 extends below the upper bound of a low point in conduit 12, a path is created for gas to flow from the pocket 36 and through the conduit 22, and gas is discharged outside of the housing 12, for example in bubbles 38. In Part D, gas continues to flow through the conduit 22, liquid 34 re-enters the housing 12 and the pocket 36 becomes smaller. Returning to Part A, the liquid 34 inside of the housing 12 eventually reaches the conduit 22, the conduit 22 floods, and gas flow through the conduit 22 stops. The process then repeats, producing discrete periods of gas discharge even when gas is supplied continuously.

Optionally, the conduit 22 may have a third opening, or an open tube 56 pointing downwards. Such an opening or tube 56 may help the conduit flood between the stages of Parts D and E but is typically not necessary. A third opening may also allow for an air-lift to be created in the part of the conduit from the third opening to the second outlet 26 to create a two phase gas-liquid discharge from the conduit 22. This may be useful if, for example, a module has a problem with liquid circulation near the top of the potting head 40. However, the inventors believe that creating a two phase flow also reduces the cleaning effect of the bubbles and so prefer a discharge that consists essentially of gas and any liquid that must be initially forced out of the conduit 22 to allow the gas to flow through the conduit.

Figure 2:
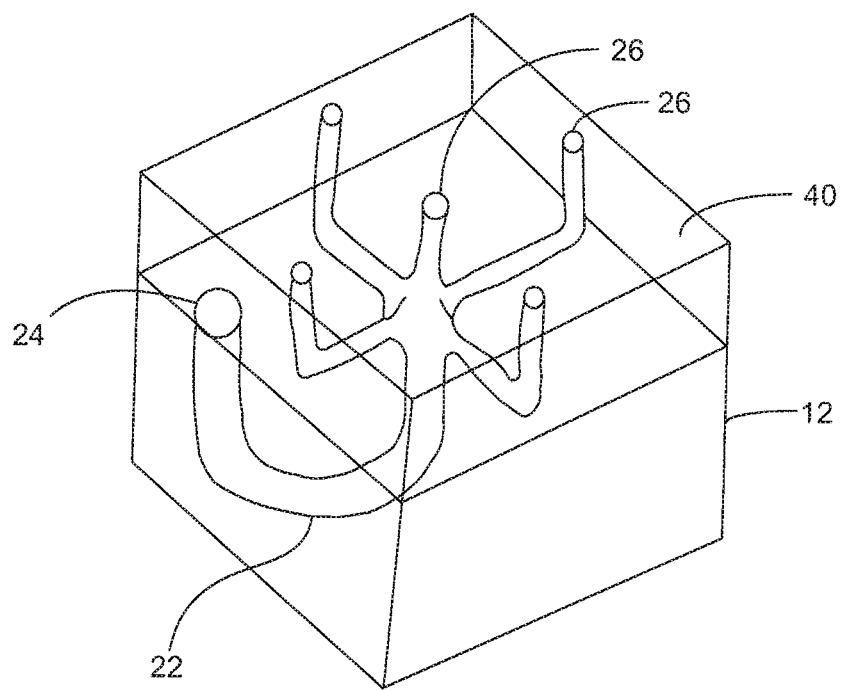
FIG. 2 shows an isometric view of an alternate conduit as in a sparger of FIG. 1.

The features of modules A, B, C and D, and the additional optional features described below, may be selected, mixed or combined together into any possible permutation or combination. The potting heads 40 may be round, square or rectangular in plan view for example. A second opening 26 may be located in the center, in plan view, of a round potting head, either as the only second opening 26 or in combination with a ring of additional second openings 26. A large module may have a large potting head that supports multiple spargers 10, for example as if the modules A, B, C and D were merged together to have a common potting head 44 but multiple spargers 10. A large potting head 44 with a plurality of conduits 22 may have the conduits distributed along the length of the potting head 44, across the width of the potting head 44, or both. A single conduit 22 may have two or more second openings 26, for example an opening on each side of a module or an opening in the middle and at each side of a module. FIG. 2 shows a further alternate conduit 22 having multiple second openings 26.

We claim:

1. A combination of a membrane module and an apparatus for providing gas bubbles in a liquid comprising,
   a) a housing defining a chamber and having an opening below the chamber allowing communication between the inside of the chamber and the outside of the chamber; and,
   b) a conduit extending from a first opening to a second opening, wherein the first opening is inside of the chamber and the second opening is outside of and above the chamber, the conduit having a first portion that extends downwards from the first opening to a low point of the conduit and a second portion that extends upwards from the low point of the conduit to the second opening in a direction from the first opening to the second opening,
   wherein,
   c) the chamber is adapted to hold a pocket of the gas above an interface between the gas pocket and the liquid, the interface having a variable elevation ranging from at least a lower boundary of the first opening in the conduit to an upper boundary of the low point of the conduit;
   d) the membrane module comprises a permeate cavity below a potting head of the membrane module;
   e) the second portion of the conduit passes through the potting head and the permeate cavity;
   f) the conduit having no third opening or tube in communication with the liquid outside of the chamber below the interface; and, g) wherein the potting head is a block of hardened resin into which membranes of the membrane module are potted.

2. The combination of claim 1, wherein the second opening of the conduit is at or above the top of the potting head.

3. The combination of claim 1 further comprising a gas supply conduit extending horizontally below the chamber and having an outlet to discharge gas into the chamber.

4. The combination of claim 1 further comprising a cap or diffuser above the potting head and over the second opening of the conduit.

5. The combination of claim 1 wherein the second opening has an area of 1-10 square cm.

6. The combination of claim 1 wherein the cross-sectional area of the second opening of the conduit is less than the horizontal cross-sectional area of the chamber by a factor of at least 10.

7. The combination of claim 1 having only one second opening.

8. The combination of claim 1 having a plurality of the potting heads, each with an associated housing and conduit, and further comprising a gas supply conduit extending horizontally below the chambers of the housings and having an outlet to discharge gas into each chamber.

\* \* \* \* \*